United States Patent Office 2,701,250
Patented Feb. 1, 1955

2,701,250

PROCESS OF PRODUCING INDOLE-3-ACETIC ACIDS

Sidney W. Fox and Milon W. Bullock, Ames, Iowa, assignors to Iowa State College Research Foundation, Inc., Ames, Iowa, a corporation of Iowa No Drawing. Application April 19, 1951,
Serial No. 221,940

11 Claims. (Cl. 260—319)

Our invention relates to a process of producing indole-3-acetic acids, and more particularly to a process of producing indole-3-acetic acids from alkyl $\gamma,\gamma$-dialkoxybutyrate or levulinic acid as starting materials.

Indole-3-acetic acid is a plant hormone which has utility as a rooting hormone and in other phytological applications which depend on its function as a growth hormone. Substituted indole-3-acetic acids such as the 1 and 2-methylindole-3-acetic acids possess similar properties as growth hormones to that of indole-3-acetic acid itself. It has been discovered that the introduction of substituents in the benzene ring such as halogen atoms, and particularly chlorine atoms, produces an unexpected increase in the level of activity of the indole-3-acetic acids. In fact, the potency or level of activity of the indole-acetic acids having at least one chlorine substituent in the benzene ring makes possible their use as weed eradicators.

In our co-pending application U. S. Serial No. 222,296, filed April 21, 1951, we have described a process for producing indole-3-acetic acids from glutamic acid as a starting material by way of the intermediate compounds of succinaldehydic acid, succinaldehydic acid phenylhydrazone, and ethyl indoleacetate. In this process, the desired indole-3-acetic acid is obtained from the alkyl ester of the indole-3-acetic acid by saponification to produce a salt of the indoleacetic acid, and then acidification to convert the salt to the acid. While the process set forth in our co-pending application U. S. Serial No. 222,296 is a marked improvement over the previous known methods for the production of indole-3-acetic acids, it does require a relatively lengthy synthesis procedure.

Therefore, it is an object of the present invention to substantially shorten the synthesis procedure for producing an indole-3-acetic acid as set forth in our co-pending application referred to above. More specifically, it is an object of our invention to provide a means for producing the alkyl indoleacetate intermediates in one step wherein a catalyst is employed to bring about the condensation of the reactants and the direct cyclization of the product produced to yield the alkyl ester of the desired indole-3-acetic acid. It is a further object of our invention to provide a method of producing alkyl indoleacetates substituted in the 2 position, and more particularly the 2-methylindole-3-acetate acids. Further objects and advantages will appear as the specification proceeds.

In general, our improved process involves the production of indoleacetic acids from alkyl $\gamma,\gamma$-dialkoxybutyrate or levulinic acid as starting materials. In our process, these starting materials are reacted with a phenylhydrazine or a phenylhydrazine hydrochloride in the presence of a suitable catalyst, which is preferably ethanolic sulfuric acid to produce the ethyl ester of the desired indole-3-acetic acid. The ester can then be saponified, and the resulting salt finally acidified to produce the acid. In more detail, the steps in our process can be represented by the following group of chemical equations, which are intended to be merely typical of one phase of our invention and not limiting as to the exact reactants employed.

(1)

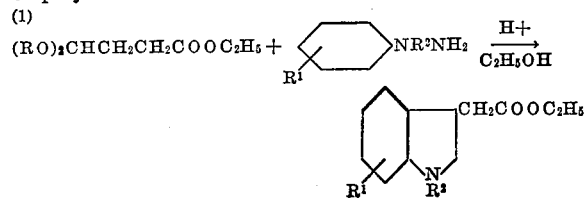

wherein R is an alkyl group, $R^1$ is hydrogen or one or more substituents in the benzene ring such as alkyl groups or halogen atoms, and $R^2$ is hydrogen, an alkyl group, or a phenyl group.

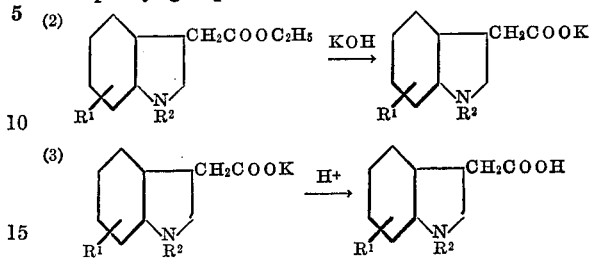

We have found that in step (1) of our process levulinic acid can be substituted for alkyl $\gamma,\gamma$-dialkoxybutyrate when it is desired to produce indole-3-acetic acids having a methyl group substituted in the 2 position. We have also found that a phenylhydrazine hydrochloride is substantially the equivalent of a phenylhydrazine in the reaction of step (1). Therefore, we wish it understood that the specific reactants shown in the above equations can be replaced by other reactants.

In general, the reaction illustrated by equation (1) above is carried out by dissolving the alkyl $\gamma,\gamma$-dialkoxybutyrate or levulinic acid and either a phenylhydrazine or a phenylhydrazine hydrochloride in a lower alcohol containing a catalyst for the reaction, and then refluxing the reaction mixture to produce an ester of indole-3-acetic acid. For the solvent in this reaction, we prefer to employ ethyl alcohol, and for the catalyst we prefer to employ concentrated sulfuric acid. However, phosphoric acid and other mineral acids can also be used. It will readily be apparent to those skilled in the art that when using ethanolic sulfuric acid the ethyl $\gamma,\gamma$-dialkoxybutyrate can be formed in situ from $\gamma,\gamma$-dialkoxybutyric acid and that an alkyl $\gamma$-oxobutyrate is equivalent to the acetal since the two compounds are in an equilibrium in an acid medium. Similarly, the ethyl ester of levulinic acid can be added to the reaction mixture instead of the acid itself. We have found that best results are obtained when the alkyl groups in the alkyl $\gamma$-dialkoxybutyrate are lower members of the alkyl series, preferably containing less than about ten carbon atoms.

By selection of a correspondingly substituted phenylhydrazine or phenylhydrazine hydrochloride, indole-3-acetic acids substituted in the 1 position or in the benzene ring can be produced. For example, when the nitrogen atom in the phenylhydrazine which is bonded to the benzene ring has one of its hydrogen atoms replaced with a methyl group, 1-methylindole-3-acetic acid will be produced. Similarly, the phenylhydrazines can contain halogen and alkyl substituents in the benzene ring.

After the formation of the reaction mixture as just described, we have found that it is desirable to reflux the mixture for several hours in order to complete the reaction. Generally, refluxing the reactants for about five to eight hours has been found sufficient to complete the reaction.

Upon completion of the condensation and cyclization reaction, we have found it desirable to subject the ester of the desired indoleacetic acid to purification before carrying out the saponification step. In general, this purification can be carried out by well-known procedures for purifying similar materials. For example, the reaction mixture can be poured into water, whereupon an oily layer will separate containing the desired product. The oil layer can then be subjected to further purification by extraction, etc. We have found that ether is a good solvent for extracting the oil layer, since the esters of indoleacetic acid are quite soluble in ether and will therefore predominate in the ether.

Following these purification procedures which are not especially critical and may be varied to a considerable extent, we have found that it is important to subject the purified oily layer to distillation. This distillation is carried out under reduced pressure, and the desired ester of indoleacetic acid is passed over to the collecting vessel as the distillate. We have found that regardless of what other purification procedures are used that this distillation step for purifying the alkyl ester of indoleacetic acid prior to saponification is quite critical, and that if it is omitted the yield of the final product will be decreased and in some cases no yield at all will be obtained.

After the purification of the alkyl ester of the desired indoleacetic acid, the distillate is saponified according to known procedures to produce a salt of indoleacetic acid. In general, the alkali metal hydroxides such as sodium hydroxide and potassium hydroxide are suitable for use as saponifying reagents. We have found it preferable to use an alcohol such as methanol or ethanol as a solvent in carrying out the saponification. For example, methanolic potassium hydroxide can advantageously be used. While not absolutely essential, we have found that refluxing of the reaction mixture containing the alkali metal hydroxide, solvent, and alkyl ester of indoleacetic acid is desired in accelerating the saponification reaction. When refluxing is utilized, the reaction will generally be complete in around one hour or less.

Following the saponification reaction, the solvent such as an alcohol can be removed and the product acidified to produce the desired indoleacetic acid. The product can then be further purified by known methods for similar materials, such as washing, recrystallization, etc. After sufficient purification, the desired indoleacetic acid will be obtained as a pure crystalline compound.

In order to facilitate the practicing of our invention, we wish to set forth the following illustrative examples, which show preferred embodiments of our invention.

EXAMPLE I

Indole-3-acetic acid

A solution of 20 g. (0.135 mole) of ethyl $\gamma,\gamma$-dimethoxybutyrate, 16.6 g. (0.135 mole) of phenylhydrazine hydrochloride, 360 ml. of absolute ethanol, and 40 ml. of concentrated sulfuric acid was refluxed under a nitrogen atmosphere for 8 hrs. The cooled reaction mixture was poured into 1 l. of ice water and the oil extracted with 350 and 250 ml. portions of ether. The combined ether extracts were washed with half-saturated sodium bicarbonate solution and dried over sodium sulfate. Distillation of the ether left 21 g. of a yellow oil. This crude ester was purified by vacuum distillation through a short vacuum-jacketed Vigreux column to give 6.0 g. distilling 150–155° at 0.1–0.25 mm. The ester was saponified by refluxing for 20 minutes with 30 ml. of 10% methanolic potassium hydroxide. Some of the potassium indole-3-acetate separated in plates during the saponification. The salt was filtered off and dissolved in water. Acidification of the aqueous solution gave 3.0 g. of almost pure indole-3-acetic acid; M. P. 166–167° (dec.). The mother liquor from which the salt was filtered was diluted with 30 ml. of water and distilled until the temperature of the vapor was 90°. The cooled solution was extracted with 30 ml. of ether, the distillation of which left a trace of crystalline product having the odor of skatole. Acidification of the aqueous solution with 10% hydrochloric acid gave a white crystalline product, which was filtered off and washed with water. This sample m. 166° (dec.); total yield 4.9 g., 21%. A recrystallization from water (Norit A) gave pure indole-3-acetic acid; M. P. 166–168° (dec.) a mixed M. P. with authentic indole-3-acetic acid was 166–168° (dec.).

EXAMPLE II

5-fluoroindole-3-acetic acid

A solution of 20 g. (0.135 mole) of ethyl $\gamma,\gamma$-dimethoxybutyrate, 17.6 g. (0.108 mole) of p-fluorophenylhydrazine hydrochloride, 360 ml. of absolute ethanol and 40 ml. of conc. sulfuric acid was refluxed in a nitrogen atmosphere for 8 hrs. The cooled solution was poured into 1 l. of ice water and the oil extracted with 350, 250 and 150 ml. portions of ether. The combined ether extracts were washed with half-saturated sodium bicarbonate solution, dried over sodium sulfate and distilled. The oily residue was vacuum-distilled through a short vacuum-jacketed stillhead to give 14.2 g. b. 150–175° at 0.4 mm. The ester was saponified by refluxing 20 min. with 60 ml. of 10% methanolic potassium hydroxide. The alkaline solution was diluted with 50 ml. of water and distilled until the temperature of the vapor was 96°. The cooled solution was extracted with 30 ml. of ether, the distillation of which left no residue. The aqueous solution was heated to boiling with 0.5 g. of Norit A and filtered. Acidification of the filtrate with 10% hydrochloric acid gave 11.0 g., 53%, from the p-fluorophenylhydrazine hydrochloride, of almost pure acid, M. P. 138–139°. After one recrystallization from water (Norit A) the acid m. 138–140°.

Analysis.—Calcd. for $C_{10}H_8O_2NF$: Neut. equiv. 193.2; N, 7.24. Found: Neut. equiv., 192 (potentiometric); N, 7.01, 7.12.

EXAMPLE III

5,7-dichloroindole-3-acetic acid

A solution of 31.2 g. (0.146 mole) of 2,4-dichlorophenylhydrazine hydrochloride, 23.0 g. (0.155 mole) of ethyl $\gamma,\gamma$-dimethoxybutyrate, 360 ml. of absolute ethanol, and 40 ml. of concentrated sulfuric acid was refluxed under nitrogen for 8 hrs. The cooled solution was poured into 1.5 liters of ice water and the ester extracted with 350 and two 250 ml. portions of ether. The combined ether extracts were dried over sodium sulfate and vacuum distilled through a short vacuum-jacketed stillhead. The product distilled over a wide range. The fraction distilling 110–240° at 0.15 mm. and weighing 17 g. was collected. This crude ester was saponified by refluxing 30 min. with 60 ml. of 10% methanolic potassium hydroxide. The solution was diluted with an equal volume of water and distilled until the temperature of the vapor was 97°. The cooled solution was extracted with two 40 ml. portions of ether, the distillation of which left a trace of oil. The aqueous solution was heated to boiling with 1 g. of Norit A and filtered. Careful acidification of the filtrate with 10% hydrochloric acid gave a brown tar, which was recovered by decantation and dried. Extraction of the tar with 20 ml. of chloroform left 4.0 g. (0.0164 mole), 11%, of almost white crystals; M. P. 181–188°. Three recrystallizations from 50% ethanol gave a product m. 192–196°; mixed M. P. with an authentic sample of 5,7-dichloroindole-3-acetic acid, M. P. 194–197°, was 193–196°. The yield of the purified acid was only 7% of the 5,7-dichlorophenylhydrazine hydrochloride used as starting material. The chloroform-soluble fraction could not be obtained in a satisfactory condition for analysis.

EXAMPLE IV

1-methylindole-3-acetic acid

A solution of 15 g. (0.085 mole) of ethyl $\gamma,\gamma$-dimethoxybutyrate, 10.4 g. (0.085 mole) of $\alpha$-methyl-$\alpha$-phenylhydrazine, 180 ml. of absolute ethanol and 20 ml. of concentrated sulfuric acid was refluxed in a nitrogen atmosphere for five hours. The cooled solution was poured into 500 ml. of ice water and the oily ester extracted with four 100 ml. portions of ether. The combined ether extracts were dried over sodium sulfate containing a small amount of sodium bicarbonate and distilled. The oily residue was purified by distillation through a short vacuum-jacketed Claisen stillhead. The ester distilled 155–160° at 0.4 mm. The crude ethyl 1-methylindole-3-acetate (13.0 g.) was saponified by refluxing 40 min. with 90 ml. of 10% methanolic potassium hydroxide. Fifty ml. of water was added and the methanol distilled off. More water was added from time to time so that the volume of the solution remained above 70 ml. The basic solution was extracted with 60 ml. of ether. The aqueous layer was heated with 0.5 g. of Norit A and filtered. Acidification with 10% hydrochloric acid gave 10.4 g., 60%, of crude 1-methylindole-3-acetic acid, M. P. 117°. Extraction of the crude material with chloroform gave a pure product, but was not entirely satisfactory because of the moderate solubility of the product in the solvent. The acid remaining in the chloroform was recovered by extraction with 30 ml. of N NaOH, and separated from a tarry contaminant by recrystallization from water (Norit A). The combined crops from the chloroform extraction and the recrystallization from water were recrystallized from a 50% solution of Skelly-solve B in benzene. The yield of pure acid, M. P. 127–129°, was 8.2 g., 51%.

EXAMPLE V

2-methylindole-3-acetic acid

A solution of 28.8 g. (0.248 mole) of levulinic acid, 36 g. (0.248 mole) of phenylhydrazine hydrochloride, 180 ml. of absolute ethanol and 20 ml. of concentrated sulfuric acid were refluxed for 3.5 hours. A solid separating from the refluxing solution was filtered off after the solution had cooled and washed with absolute ethanol. This salt weighed 10.5 g. and m. 332–335° (dec.) after softening from 180°.

The ethanol solution from which the salt was filtered was poured into 1 liter of ice water and the precipitated oil was extracted with three 250 ml. portions of ether. The combined ether extracts were washed with 150 ml. of half-saturated sodium bicarbonate solution and dried over sodium sulfate. Distillation of the ether solution left a dark oil which was purified by vacuum distillation. This distillation gave 45 g., 89%, of ethyl 2-methylindole-3-acetate, B. P. 158–160° at 0.15 mm.

The ester was saponified by refluxing 30 min. with 160 ml. of 10% methanolic potassium hydroxide. The solution was diluted with 200 ml. of water and the methanol distilled off. The cooled solution was extracted with 50 ml. of ether, the distillation of which left a trace of oil. The aqueous layer was heated to boiling with 0.5 g. of Norit A and filtered. Acidification of the filtrate with 10% hydrochloric acid gave a crystalline product. After the solution had cooled the crystals were collected by filtration and washed with water. This gave 34.7 g. of pure acid; M. P. 197–199° (dec.). An additional 2 g. of pure product was recovered from the mother liquor; total yield of pure product 36.7 g. (87% based on the ester, or 79% on the levulinic acid).

EXAMPLE VI

*2-methylindole-3-acetic acid*

Phenylhydrazone levulinate was prepared by neutralizing phenylhydrazine with levulinic acid. The salt was dissolved in four parts of ethanol, one part of syrupy phosphoric acid was added, and the solution heated near the boiling point for two hours. The solution was made alkaline with 40% sodium hydroxide solution and the solution warmed several hours to hydrolyze the ester. The solution was clarified by treatment with Norit A and filtering through a layer of diatomaceous earth. Acidification of the aqueous solution with hydrochloric acid gave an impure crystalline product. Extraction of the dried crystals with chloroform left pure 2-methyl-indole-3-acetic acid, M. P. 198°. The yield was approximately 30%.

The alkyl γ,γ-dihydroxybutyrate employed in our process can be prepared according to well-known procedures such as that described by Adkins and Kresek in the J. Am. Chem. Soc. 71, 3,051 (1949). In this process, the particular alkyl groups in the molecule depend on the particular ester used as a starting material and the alcohol used as a solvent. It will be understood, that in our process any alkyl γ-oxobutyrate or any alkyl γ,γ-dihydroxybutyrate are chemically equivalent.

While in the foregoing specification we have set out specific details of our process, it will be apparent to those skilled in the art that many of the details set forth can be varied widely without departing from the spirit of our invention.

We claim:

1. In a process of producing indole-3-acetic acids, the step of refluxing a reaction mixture containing a compound selected from the group consisting of alkyl γ,γ-dimethoxybutyrate and levulinic acid and a member selected from the group consisting of phenylhydrazine and phenylhydrazine hydrochloride, while promoting the conversion of said reactants to an ethyl indoleacetate ester by the presence as a catalyst of a lower saturated aliphatic alcohol acidified with a strong acid.

2. In a process of producing indole-3-acetic acids, the steps of forming a reaction mixture by dissolving a member selected from the group consisting of concentrated phosphoric acid and concentrated sulfuric acid, a member selected from the group consisting of alkyl γ,γ-dimethoxybutyrate and levulinic acid, and a compound selected from the group consisting of phenylhydrazine and phenylhydrazine hydrochloride in ethanol, and then refluxing the reaction mixture thus formed to produce an ethyl ester of indole-3-acetic acid.

3. In a process of producing indole-3-acetic acids, the step of refluxing the reaction mixture containing ethyl γ,γ-dimethoxybutyrate, a member selected from the group consisting of phenylhydrazine and phenylhydrazine hydrochloride, and an ethanolic sulfuric acid catalyst to produce an ethyl ester of indole-3-acetic acid.

4. In a process of producing indole-3-acetic acids, the steps of forming a reaction mixture by dissolving concentrated sulfuric acid, ethyl γ,γ-dimethoxybutyrate, and phenylhydrazine in ethanol, and then refluxing the reaction mixture to produce an ethyl ester of indole-3-acetic acid.

5. In a process of producing indole-3-acetic acids, the steps of refluxing a reaction mixture containing a member selected from the group consisting of ethyl γ,γ-dimethoxybutyrate and levulinic acid, a compound selected from the group consisting of phenylhydrazine and phenylhydrazine hydrochloride, concentrated sulfuric acid, and ethanol to produce an ethyl ester of indole-3-acetic acid, separating the ester of indole-3-acetic acid from the reaction mixture, distilling the separated ester at reduced pressure to produce a distillate containing the purified ester of indole-3-acetic acid, and saponifying the said ester to yield the salt of the desired product.

6. In a process of producing indole-3-acetic acids, the steps of forming the reaction mixture by dissolving concentrated sulfuric acid, a compound selected from the group consisting of ethyl γ,γ-dimethoxybutyrate and levulinic acid, and a compound selected from the group consisting of phenylhydrazine and phenylhydrazine hydrochloride in ethanol, refluxing the reaction mixture thus formed to produce an ethyl ester of an indole-3-acetic acid, separating the ester of indole-3-acetic acid from the reaction mixture, distilling the separated ester at reduced pressure to produce a distillate containing the purified ester of indole-3-acetic acid, and saponifying the said ester to yield the salt of the desired product.

7. In a process of producing indole-3-acetic acids, the steps of refluxing a reaction mixture containing ethyl γ,γ-dimethoxybutyrate, a compound selected from the group consisting of phenylhydrazine and phenylhydrazine hydrochloride, concentrated sulfuric acid, and ethanol to produce an ethyl ester of indole-3-acetic acid, separating the ester of indole-3-acetic acid from the reaction mixture, distilling the separated ester at reduced pressure to produce a distillate containing the purified ester of indole-3-actic acid, and saponifying the said ester to yield the salt of the desired product.

8. In a process of producing indole-3-acetic acids, the step of refluxing the reaction mixture containing ethyl γ,γ-dimethoxybutyrate, a member selected from the group consisting of phenylhydrazine and phenylhydrazine hydrochloride, and ethanolic phosphoric acid to produce an ethyl ester of indole-3-acetic acid.

9. In a process of producing indole-3-acetic acids unsubstituted in the 2-position, a step of refluxing a reaction mixture containing an alkyl γ,γ-dialkoxybutyrate and a member selected from the group consisting of phenylhydrazine and phenylhydrazine hydrochloride in the presence as a catalyst of a lower primary saturated aliphatic alcohol acidified with an acid selected from the group consisting of sulfuric acid and phosphoric acids.

10. In a process of producing indole-3-acetic acids unsubstituted in the 2-position, the step of refluxing a reaction mixture containing an alkyl γ,γ-dialkoxybutyrate and a member selected from the group consisting of phenylhydrazine and phenylhydrazine hydrochloride, while promoting the conversion of said reactants to an indole-acetate ester by the presence as a catalyst of a lower saturated aliphatic alcohol acidified with a strong acid.

11. In a process of producing indole-3-acetic acids unsubstituted in the 2-position, a step of refluxing a reaction mixture containing an alkyl γ,γ-dialkoxybutyrate and a member selected from the group consisting of phenylhydrazine and phenylhydrazine hydrochloride in the presence as a catalyst of a lower primary saturated aliphatic alcohol acidified with a mineral acid to produce an indole-acetate ester.

References Cited in the file of this patent

UNITED STATES PATENTS 2,222,344  Bauer et al. _____ Nov. 19, 1950

OTHER REFERENCES

Stevens et al.: Jr. Am. Chem. Soc., vol. 70, pp. 2263–65 (1948).